US007613180B2

(12) United States Patent
Tanaike et al.

(10) Patent No.: US 7,613,180 B2
(45) Date of Patent: Nov. 3, 2009

(54) MEDIA COMMUNICATION APPARATUS AND MEDIA COMMUNICATION METHOD

(75) Inventors: Tsuneo Tanaike, Tokyo (JP); Shinichiro Iwatsuru, Tokyo (JP); Suehiro Mochizuki, Tokyo (JP)

(73) Assignees: Aruze Corporation, Tokyo (JP); Seta Corporation, Tokyo (JP)

( * ) Notice: Subject to any disclaimer, the term of this patent is extended or adjusted under 35 U.S.C. 154(b) by 420 days.

(21) Appl. No.: 11/174,719

(22) Filed: Jul. 6, 2005

(65) Prior Publication Data

US 2006/0083171 A1 Apr. 20, 2006

(30) Foreign Application Priority Data

Jul. 13, 2004 (JP) ............................. 2004-205399

(51) Int. Cl.
 *H04L 12/56* (2006.01)
(52) U.S. Cl. ................................. 370/389; 370/395.31
(58) Field of Classification Search ................. 370/401, 370/400, 422, 389
 See application file for complete search history.

(56) References Cited

U.S. PATENT DOCUMENTS

| 6,470,008 | B1 * | 10/2002 | Khuc ......................... 370/352 |
| 2002/0141386 | A1 * | 10/2002 | Minert et al. ............... 370/352 |
| 2003/0002637 | A1 * | 1/2003 | Miyauchi et al. ......... 379/93.01 |
| 2006/0007915 | A1 * | 1/2006 | Frame ....................... 370/352 |

FOREIGN PATENT DOCUMENTS

| CN | 1487700 A | 4/2004 |
| EP | 1 113619 | 7/2001 |
| JP | 2003-506929 | 2/2003 |
| JP | 2004-129134 | 4/2004 |
| JP | 2004-134825 | 4/2004 |
| WO | WO 01/10140 | 2/2001 |

OTHER PUBLICATIONS

Handley et al. (SIP: Session Initiation Protocol RFC-2543 1999).*
"Guide to Cisco Systems' VoIP Infrastructure Solution for SIP Version 1.0," [Online] 2000, XP002351901 Cisco website retrieved from the Internet: URL;http://www.cisco.com/univercd/cc/td/doc/product/voice/sipsols/biggulp/bgsip.pdf> [retrieved on Oct. 31, 2005], Only one page provided.
Henning, S. et al, "Internet Telephony: Architecture and Protocols an IETF Perspective," [Online] Jul. 2, 1998, XP002351902 retrieved from the Internet: URL:http://www.cs.columbia.edu/~hgs/papers/Schu9902_Internet.pdf> [retrieved on Oct. 31, 2005].

* cited by examiner

*Primary Examiner*—Gregory B Sefcheck
*Assistant Examiner*—Nima Mahmoudzadeh
(74) *Attorney, Agent, or Firm*—Oliff & Berridge, PLC (57) ABSTRACT

There is provided a media communication apparatus including an automatic selection unit which automatically selects a telecommunications carrier by preset criteria on the address of a speech terminal serving as a communication destination input at the time of call origination and a communication system which identifies the communication conventions of a server of the selected telecommunications carrier and communicates media in accordance with the communication conventions, wherein the communication system has an automatic identification unit which automatically identifies the communication protocol of the server of the selected telecommunications carrier, a session establishment unit which establishes a session according to the identified communication protocol, and a packet communication unit which communicates media in packets on the basis of the established session.

14 Claims, 8 Drawing Sheets

STATUS LINE → SIP/2.0 100trying  
          STATUS CODE

HEADER {
Via : SIP/2.0/UDP 123.456.78.90:5060
TO : Bclient<sip:Bclient@example.com>
FROM : Aclient<sip:Aclient@example.com>
Call-ID : a84b4c76e66710@example.com ← H1
CSeq : 314159 INVITE ← H2
Contact : <sip:xxxx@192.0.2.4>
Content-Type : application/sdp
Content-Length : 142
}

FIG. 6

REQUEST LINE → SUBSCRIBE sip:presentity@pres.com SIP/2.0

HEADER {
Via : SIP/2.0/UDP 123.456.78.90:5060
FROM : Aclient<sip:Aclient@example.com>
TO : Resource<sip:resource@example.com>
Call-ID : 3248543@example.com
CSeq : 1 SUBSCRIBE
Expires : 600
Accept : application/cpim-pidf+xml
Contact : sip:user@watcherhost.com
}

(A)

REQUEST LINE → NOTIFY sip:presentity@pres.com SIP/2.0

HEADER {
Via : SIP/2.0/UDP 123.456.78.90:5060
FROM : Resource<sip:resource@example.com>
TO : Aclient<sip:Aclient@example.com>
Call-ID : 3248543@example.com ← H3
CSeq : 1 NOTIFY ← H4
Content-Type : application/cpim-pidf+xml
Content-Length : 362 ← H5
}

| Telecommunication Carrier | Type of Communication Destination Speech Terminal | Communication Time Period (Basic Communication Charge) | | | | Communication Distance (To be added to basic communication charge) | | | | | |
|---|---|---|---|---|---|---|---|---|---|---|---|
| | | Weekdays (Mon to Sat) 8:00~23:00 | Weekdays (Mon to Sat) 23:00~8:00 | Holidays (Public Holidays) 8:00~23:00 | Holidays (Public Holidays) 23:00~8:00 | Neighboring Zone: Up to 20km | Up to 30km | Up to 60km | Up to 100km | Up to 170km | Over 170km |
| Carrier A | General Subscriber Telephone | ¥9/3MIN | ¥9/4MIN | ¥9/3MIN | ¥9/4MIN | ¥20/3MIN | ¥30/3MIN | ¥20/3MIN | ¥40/3MIN | ¥40/3MIN | ¥40/3MIN |
| | Cellular Phone | ¥11/20SEC | ¥11/30SEC | ¥11/33SEC | ¥11/45SEC | — | — | — | — | — | — |
| | PHS | ¥11/20SEC | ¥11/21SEC | ¥11/21SEC | ¥11/21SEC | — | — | — | — | — | — |
| | Contract IP Phone | No Charge | No Charge | No Charge | No Charge | No Charge | No Charge | No Charge | No Charge | No Charge | No Charge |
| | IP Phone of Other Type | ¥1000/MON | ¥1000/MON | ¥1000/MON | ¥1000/MON | ¥20/3MIN | ¥20/3MIN | ¥20/3MIN | ¥20/3MIN | ¥20/3MIN | ¥20/3MIN |
| Carrier B | General Subscriber Telephone | ¥10/4MIN | ¥10/4MIN | ¥10/4MIN | ¥10/4MIN | ¥20/4MIN | ¥30/4MIN | ¥40/4MIN | ¥60/4MIN | ¥80/4MIN | ¥80/4MIN |
| | Cellular Phone | ¥12/20SEC | ¥12/30SEC | ¥12/33SEC | ¥12/45SEC | — | — | — | — | — | — |
| | PHS | ¥12/20SEC | ¥12/21SEC | ¥12/21SEC | ¥12/21SEC | — | — | — | — | — | — |
| | Contract IP Phone | No Charge | No Charge | No Charge | No Charge | No Charge | No Charge | No Charge | No Charge | No Charge | No Charge |
| | IP Phone of Other Type | ¥900/MON | ¥900/MON | ¥900/MON | ¥900/MON | ¥21/3MIN | ¥21/3MIN | ¥21/3MIN | ¥21/3MIN | ¥21/3MIN | ¥21/3MIN |
| Carrier C | General Subscriber Telephone | ¥11/3MIN | ¥11/4MIN | ¥11/3MIN | ¥11/4MIN | ¥21/3MIN | ¥21/3MIN | ¥21/3MIN | ¥21/3MIN | ¥21/3MIN | ¥21/3MIN |
| | Cellular Phone | ¥13/25SEC | ¥13/35SEC | ¥13/38SEC | ¥13/50SEC | — | ¥32/3MIN | ¥43/3MIN | ¥64/3MIN | ¥85/3MIN | ¥85/3MIN |
| | PHS | ¥13/20SEC | ¥13/21SEC | ¥13/21SEC | ¥13/21SEC | — | — | — | — | — | — |
| | Contract IP Phone | No Charge | No Charge | No Charge | No Charge | No Charge | No Charge | No Charge | No Charge | No Charge | No Charge |
| ... | ... | ... | ... | ... | ... | ... | ... | ... | ... | ... | ... |

MEDIA COMMUNICATION APPARATUS AND MEDIA COMMUNICATION METHOD

The present disclosure relates to subject matters contained in Japanese Patent Application No. 2004-205399 filed on Jul. 13, 2004, which are expressly incorporated herein by reference in its entireties.

BACKGROUND OF THE INVENTION

1. Field of the Invention

The present invention relates to, for example, a media communication apparatus and a media communication program product, which, by automatically selecting a telecommunications carrier offering the lowest communication charge on the basis of communication charges set for each of IP (Internet Protocol) telephony telecommunications carriers and automatically identifying the communication protocol of the telecommunications carrier (server for session management), can receive a communication connection service provided by the telecommunications carrier through a communication path to which the lowest communication charge applies.

2. Description of the Prior Art

In recent years, the Internet has become widespread as a giant network formed by connecting, through leased lines, computer networks (e.g., a LAN (Local Area Network) and WAN (Wide Area Network)) scattered across various locations, thereby making many services available.

For example, there is provided an IP telephony communication connection service as shown in National Publication of International Patent Application No. 2003-506929, as one of services utilizing the Internet. There is also provided an IP telephony communication connection service which utilizes an IP telephony-specific network having the same mechanism as the Internet. The Internet itself and an IP telephony-specific network which is not directly connected to the Internet are generically called IP networks, and voice communication is performed through such an IP network in an IP telephony communication connection service. In this case, in an IP network, voice data is divided into small units (packets) and delivered to the other end, where the packets are reconstructed into the original voice. There is available VoIP (Voice over IP) as a technique for implementing such voice communication.

IP telephony generally adopts a set of communication conventions (communication protocol) called H.323 standardized by the Telecommunication Standardization Sector (ITU-T) of the International Telecommunication Union (ITU). However, since H.323 has, e.g., the disadvantage that it is hard to work in cooperation with other Internet applications, SIP (Session Initiation Protocol) is attracting attention as a communication protocol for eliminating the disadvantage.

SIP is a set of communication conventions (communication protocol such as VoIP used in conversion of voice communication to IP) which are established by the IETF (Internet Engineering Task Force) and documented in an RFC (Request for Comment) SIP has, e.g., the advantages that it is text-based and can be decoded, and thus facilitates development, that it has an openness which allows not only specialists but also clients (terminals) to deal with it, and that services between clients (terminals) can be enriched because it is a protocol which establishes a session.

Now, various telecommunications carriers provide IP telephony communication connection services utilizing the advantages of SIP. In this case, the communication protocol, SIP, is used to establish, change, and end a session (manage a session) and has no concern with the contents of the session. Each telecommunications carrier sets up a SIP server for performing such session management. For example, when a client (terminal) is to communicate voice data in packets, session management on the basis of SIP messages of a predetermined type is performed between the client (terminal) and the SIP server. When a session is established, voice data is delivered to a desired party and is reconstructed. Note that the format of a SIP message is similar to, e.g., a standard message format utilized in the Internet (such as SMTP (Simple Mail Transfer Protocol) or HTTP (HyperText Transfer Protocol)), and the procedures for SIP messages are defined by, e.g., a request method (request message) such as an INVITE (invitation) or ACK (acknowledgment) and a response (status) code (response message) such as a 100Trying (provisional response) or 200ok (successful response).

A media communication apparatus (IP telephone adaptor) provided by a specific telecommunications carrier when the client (terminal) makes a connectivity contract with the telecommunications carrier can establish a session only with the telecommunications carrier through SIP messages and cannot establish a session with any other telecommunications carrier through SIP messages. This is because a session is performed through SIP messages of a type unique to each telecommunications carrier in accordance with the specifications and settings of a SIP server of the telecommunications carrier. For this reason, a media communication apparatus specific to another telecommunications carrier needs to be separately prepared to establish a session with the other telecommunications carrier through SIP messages. In this case, a client (terminal) needs to prepare a plurality of media communication apparatuses specific to telecommunications carriers, respectively, in order for the client (terminal) to receive the IP telephony communication connection services provided by the plurality of telecommunications carriers. As a result, the construction of a system for performing voice communication through an IP network becomes complicated, and at the same time, the cost of equipment to that purpose increases.

This problem can be solved with a media communication apparatus and media communication program which can establish a session through SIP messages for each of the plurality of telecommunications carriers to communicate media. However, such a media communication apparatus and media communication program are not known at present.

Also, there is already known an IP telephone system with an LCR (Least Cost Routing) function or ACR (Automatic Carrier Routing) function as a telephone communication connection technique (see, e.g., Japanese Patent Laid-Open No. 2004-129134 and Japanese Patent Laid-Open No. 2004-134825). In such a service, it is possible to automatically select a communication path to which the lowest communication charge applies on the basis of the address (e.g., an IP telephone number, general subscriber telephone number, cellular telephone number, IP address, or the like) of a party to be called input at the time of call origination.

In this case, when a call is originated by inputting the address of the party to be called, the IP telephone system selects a telecommunications carrier which offers the lowest communication charge from a selection table (table in which communication charges for each of telecommunications carriers are registered in advance) on the basis of the address and establishes a connection for speech through the communication path of the telecommunications carrier. This allows mutual speech.

However, the above-described IP telephone system is one which is compatible with a communication protocol compliant with H.323 and is not compatible with a communication protocol compliant with SIP in the spotlight now. Accordingly, the system cannot be directly applied to a media communication apparatus and media communication program which establish a session through SIP messages of a type different for each of telecommunications carriers and communicate media.

SUMMARY OF THE INVENTION

It is an object of the present invention to provide a media communication apparatus and media communication program which can automatically select a telecommunications carrier by preset criteria on the basis of the address of a speech terminal serving as a communication destination input at the time of call origination and communicate media in accordance with the communication conventions of the server of the selected telecommunications carrier.

In order to achieve the object, according to the present invention, there is provided a media communication apparatus receiving communication connection services provided by telecommunications carriers, the media communication apparatus comprising selection means (e.g., automatic selection means 38) selecting a telecommunications carrier on the basis of an address of a speech terminal inputted as a communication destination at the call origination, in accordance with a preset criterion; and communication means (e.g., a communication system) identifying a communication convention of a server provided by the telecommunications carrier selected by the selection means, and communicating media data in accordance with the identified communication convention. The communication means may identification means (e.g., automatic identification unit 10) identifying a communication protocol of the server of the telecommunications carrier selected by the selection means, session establishment means (e.g., session establishment unit 12) establishing a session with terminals according to the communication protocol identified by the identification means, and a packet communication means (e.g., packet communication unit 14) communicating media data via packet communication during the session established by the session establishment means.

With this arrangement, for example, automatic selection of a telecommunications carrier which offers the lowest communication charge on the basis of communication charges set for each of IP telephony telecommunications carriers and automatic identification of a communication protocol of the telecommunications carrier (server for session management) make it possible to receive communication connection services provided by telecommunications carriers through a communication path to which the lowest communication charge applies.

Also, according to the present invention, there is provided a media communication program product receiving communication connection services provided by telecommunications carriers in accordance with a predetermined procedure, comprising the steps of selecting a telecommunications carrier on the basis of an address of a speech terminal inputted as a communication destination at the call origination, in accordance with a preset criterion; and identifying a communication convention of a server provided by the selected telecommunications carrier, and communicating media data in accordance with the identified communication convention. The program product may further comprise the steps of identifying the communication protocols used by the servers managing a session with terminals when the servers communicates media data via packet communication, the communication protocols being different with each other among the telecommunications carriers, identifying a communication protocol of the server of the selected telecommunications carrier, establishing a session with terminals according to the identified communication protocol, and communicating media data via packet communication during the established session.

With this program product, for example, automatic selection of a telecommunications carrier which offers the lowest communication charge on the basis of communication charges set for each of IP telephony telecommunications carriers and automatic identification of a communication protocol of the telecommunications carrier (server for session management) make it possible to receive communication connection services provided by telecommunications carriers through a communication path to which the lowest communication charge applies.

In this invention, the selection means (automatic selection procedure) has a table (step of setting various types of data in the table) in which the various types of data used to select a telecommunications carrier by the preset criterion are set, a telecommunications carrier registration unit (telecommunications carrier registration step) which registers a telecommunications carrier with which a calling speech terminal has a contract, a communication destination terminal determination unit (communication destination terminal determination step) which determines the speech terminal serving as the communication destination on the basis of the address input at the time of call origination, and a telecommunications carrier selection unit (telecommunications carrier selection step) which checks a determination result from the communication destination terminal determination unit against the various types of data in the table and selects a predetermined telecommunications carrier. In this case, the various types of data in the table include one of communication charges, each based on arbitrarily selected conditional factors, a type of a speech terminal serving as a communication destination, communication time period, day of the week of communication, and communication distance, and communication charges set on the basis of the conditional factors and another additional conditional factor, and the communication charges are set for each of the telecommunications carriers. With this arrangement, the telecommunications carrier selection unit (telecommunications carrier selection step) of the automatic selection means (automatic selection procedure) checks the determination result from the communication destination terminal determination unit (communication destination terminal determination step) against the various types of data in the table and selects a telecommunications carrier which offers the lowest communication charge.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out hereinafter.

BRIEF DESCRIPTION OF THE DRAWINGS

FIG. 10 is a chart showing a data arrangement example of a table in which communication charges, each based on the type of a speech terminal serving as a communication destination, a communication time period, a day of the week of communication, and a communication distance, are set for each of telecommunications carriers.

The accompanying drawings, which are incorporated in and constitute apart of the specification, illustrate embodiments of the invention, and together with the general description given above and the detailed description of the embodiments given below, serve to explain the principles of the invention.

DESCRIPTION OF THE PREFERRED EMBODIMENTS

A media communication apparatus and media communication program of the present invention will be explained below with reference to the accompanying drawings.

Figure 1:
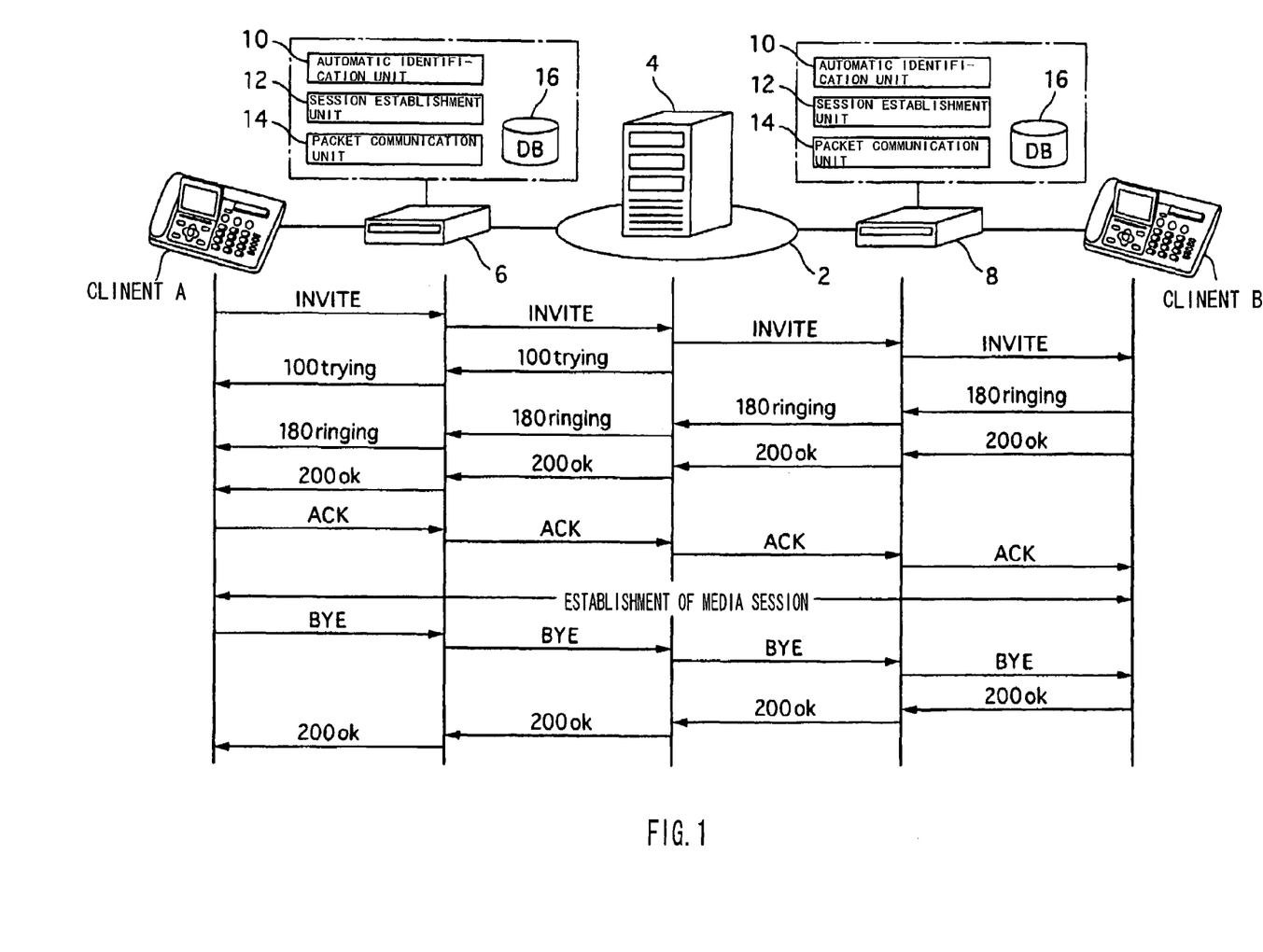
FIG. 1 is a view showing the basic arrangement of an IP network in which media communication apparatuses and a media communication program according to an embodiment of the present invention are used.

FIG. 1 exemplifies the basic arrangement of an IP network 2 in which media communication apparatuses and a media communication program of the present invention are used. A SIP server 4 of one telecommunications carrier (not shown) which provides an IP telephony communication connection service is set up in the IP network 2.

Note that the SIP server 4 can be composed of, e.g., a registration server, location server, redirect server, and proxy server (none of them is shown).

In this case, the registration server has, e.g., a function of registering the location information of a calling or called client terminal on the basis of a registration request transmitted from the calling or called client terminal. The location server is a database server which derives the location information of a client terminal serving as an access target (callee) on the basis of the location information of the client terminal. The redirect server has a function of notifying the calling client terminal of the current location information of the client terminal serving as the access target (callee) in response to an "INVITE (request message)" transmitted from the calling client terminal. The proxy server has a function of performing session management by proxy in response to the "INVITE" transmitted from the calling client terminal.

In this IP network 2, for example, an IP telephone or cellular telephone (including a PHS (Personal Handyphone System)), a fixed personal computer or mobile PC (Personal Computer), a PDA (Personal Digital Assistant), or the like can be used as a client terminal which receives the communication connection service provided by the telecommunications carrier. In the explanation below, an IP telephone (e.g., a client A or client B) is assumed as an example of the client terminal.

For example, assume a case wherein the client A accesses the client B. In this case, session management based on SIP messages of a predetermined type is performed between the SIP server 4 and a calling media communication apparatus 6 of the client A serving as a communication source. When a session is established, media are delivered from a called media communication apparatus 8 serving as a communication destination to the client B and are reconstructed. In this case, the media include, e.g., character information, voice information, image information (moving image or still image), and an application (software program designed to perform a specific task). In this embodiment, voice information will be assumed as an example of the media.

A SIP message is defined by a communication protocol which is different for each of SIP servers (including the SIP server 4) of telecommunications carriers. Accordingly, the media communication apparatuses 6 and 8 are arranged to be capable of automatically identifying the communication protocol of a telecommunications carrier (SIP server 4) serving as an access target, establishing a session in accordance with the identified communication protocol, and communicating voice information (media) in packets.

In order to implement such a communication process, the media communication apparatuses 6 and 8 are each provided with a communication system comprising automatic identification means for automatically identifying different types of communication protocols, session establishment means for establishing a session according to an identified communication protocol, and packet communication means for communicating voice information (media) in packets on the basis of the established session.

In this case, various pieces of hardware (e.g., an automatic identification unit 10, session establishment unit 12, and packet communication unit 14) with functions serving as automatic identification means, session establishment means, and packet communication means may be mounted in each of the media communication apparatus 6 and 8. Alternatively, a media communication program for having the media communication apparatuses 6 and 8 execute an automatic identification procedure for automatically identifying different types of communication protocols, session establishment procedure for establishing a session according to an identified communication protocol, and packet communication procedure for communicating voice information (media) in packets on the basis of the established session may be programmed into (installed in) various pieces of hardware already mounted in each of the media communication apparatuses 6 and 8.

In this arrangement, for example, if the client A calls the client B (inputs a telephone number), an "INVITE (request message)" is transmitted from the client A to the media communication apparatus 6. Then, the "INVITE" is transmitted from the packet communication unit 14 of the media communication apparatus 6 to the SIP server 4. At this time, a "100trying (response message)" provisional response is transmitted from the SIP server 4 toward the media communication apparatus 6, and at the same time, the "INVITE" is transmitted from the media communication apparatus 8 (packet communication unit 14) toward the client B.

Note that the "100trying" provisional response having been transmitted from the SIP server 4 is transmitted to the client A via the packet communication unit 14 of the media communication apparatus 6.

In this state, a "180ringing (response message)" call response from the client B is transmitted from the media communication apparatus 8 (packet communication unit 14) to the SIP server 4. At that time, the "180ringing (response message)" is transmitted from the SIP server 4 toward the client A via the media communication apparatus 6 (packet communication unit 14).

After that, when a request message is comprehended, a "200ok (response message)" successful response from the client B is transmitted from the media communication apparatus 8 to the client A via the SIP server 4 and media communication apparatus 6. When an "ACK (request message)" approval response from the client A is transmitted from the media communication apparatus 6 to the client B via the SIP server 4 and media communication apparatus 8, the session establishment unit 12 (media communication program which enforces the execution of the session establishment procedure) establishes a media session between the client A and the client B, and voice information starts to be transmitted/received (speech state). Note that in the speech state, voice information passes not through the SIP server 4 but through, e.g., a media server (not shown) set up in the IP network 2 or the like and is directly transmitted/received between the client A and the client B.

For example, when the client A places the telephone on-hook (puts down the receiver) to end the call, a "BYE (terminate request message)" from the client A is transmitted from the media communication apparatus 6 to the client B via the SIP server 4 and media communication apparatus 8. When a "200ok" termination response from the client B is transmitted from the media communication apparatus 8 to the client A via the SIP server 4 and media communication apparatus 6 in response to this, all transactions between the client A and the client B end.

In the media communication apparatuses 6 and 8 of this embodiment, the automatic identification unit 10 (media communication program which enforces the execution of the automatic identification procedure) automatically identifies the communication protocol of the telecommunications carrier (SIP server 4) while the above-described SIP messages (request messages and response messages) are exchanged. In this case, the automatic identification process is preferably performed before session establishment. Performance of the automatic identification process at this stage makes it possible to identify a communication protocol which is different for each of SIP servers (including the SIP server 4) of telecommunications carriers without any charge.

The automatic identification unit 10 (automatic identification procedure) is provided with registration means (DB: database) 16 for registering an identification result (includes a registration step of registering the identification result), and a communication protocol having been subjected to the identification process and the identification result of the identification process are registered, in the database 16, in association with each other. For this reason, when voice information (media) is to be communicated in packets later in accordance with the already registered communication protocol, the time required for session establishment can be shortened by using (referring to) the identification result in the database 16.

As a method of automatically identifying the communication protocol (SIP messages) of the telecommunications carrier (SIP server 4) in the media communication apparatuses 6 and 8, for example, there can be used one of the following: (1) a method of analyzing the contents of a response message; (2) a method of analyzing the call flow at the time of message exchange; (3) a method of analyzing an error code contained in a response message; and (4) a method of analyzing the state of the communication protocol obtained when a subscribe request is transmitted. This makes it possible to identify different types of communication protocols.

These automatic identification methods (1) to (4) will be explained below by giving specific examples.

Figure 2:
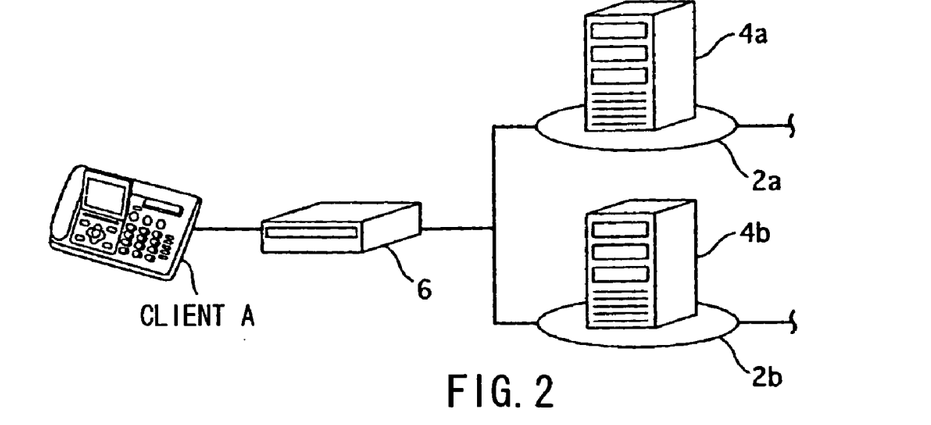
FIG. 2 is a view showing an arrangement example in which a client and one of the media communication apparatuses are set up in a global space together with SIP servers.

For example, the explanation assumes that the client A and media communication apparatus 6 are set up in a global space (on the Internet) including a plurality of (two in FIG. 2) IP networks 2a and 2b of different telecommunications carriers, and SIP servers 4a and 4b are respectively set up in the IP network 2a and 2b, as shown in FIG. 2. The explanation also assumes that a global IP address is assigned to each of the client A, media communication apparatus 6, and SIP servers 4a and 4b. Since automatic identification methods which the media communication apparatus 6 uses for the SIP servers 4a and 4b when the client A calls the client B are the same as those which the media communication apparatus 8 uses for the SIP servers 4a and 4b when the client B calls the client A, only the case will be explained below wherein the client A calls the client B.

(1) Method of Analyzing Contents of Response Message

As the contents of a response message, for example, the type of a status code, header features, and the like can be assumed.

Figure 5:
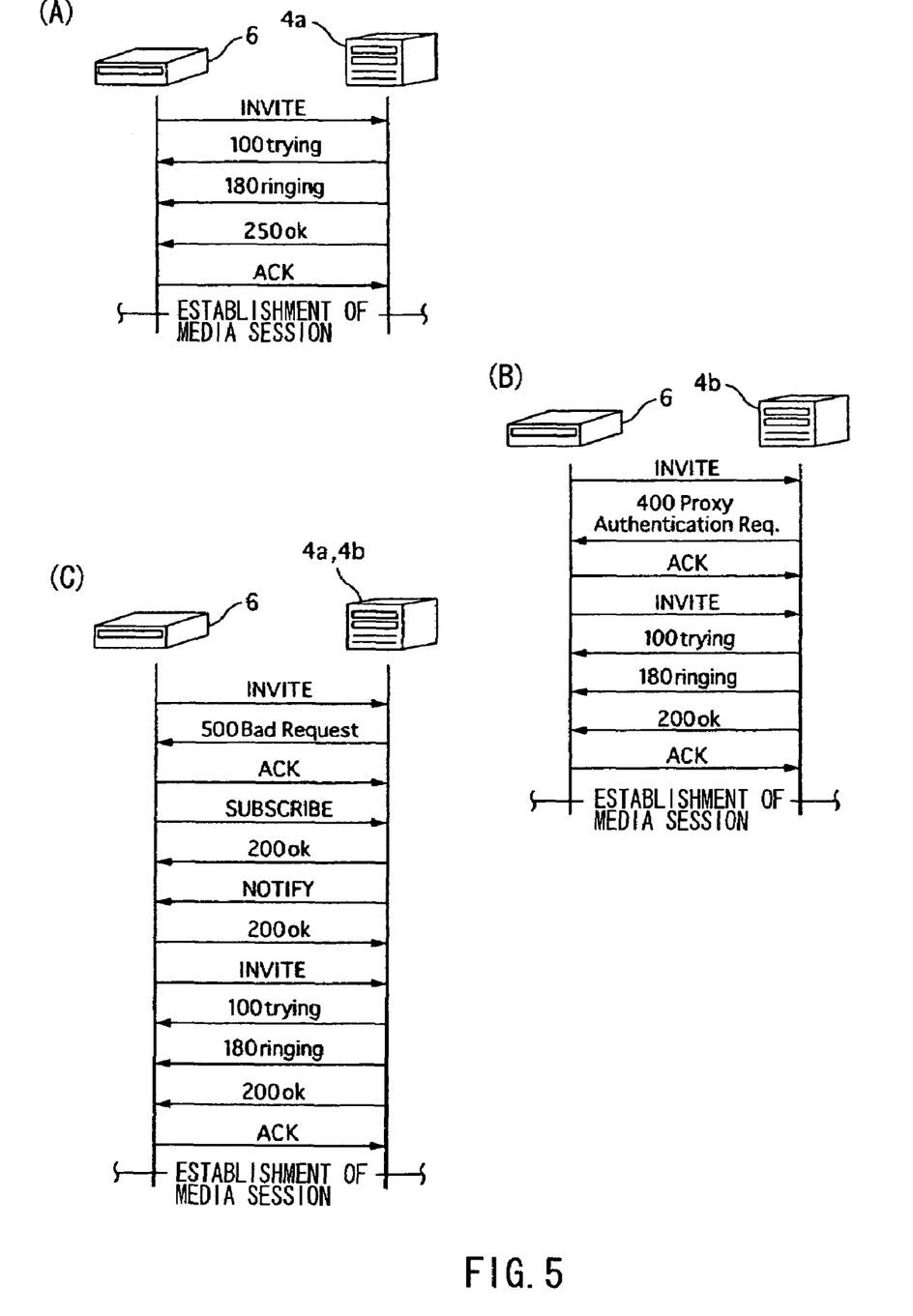
FIGS. 5(A) to 5(C) are charts for explaining an automatic identification method of the media communication apparatus.
Figure 6:
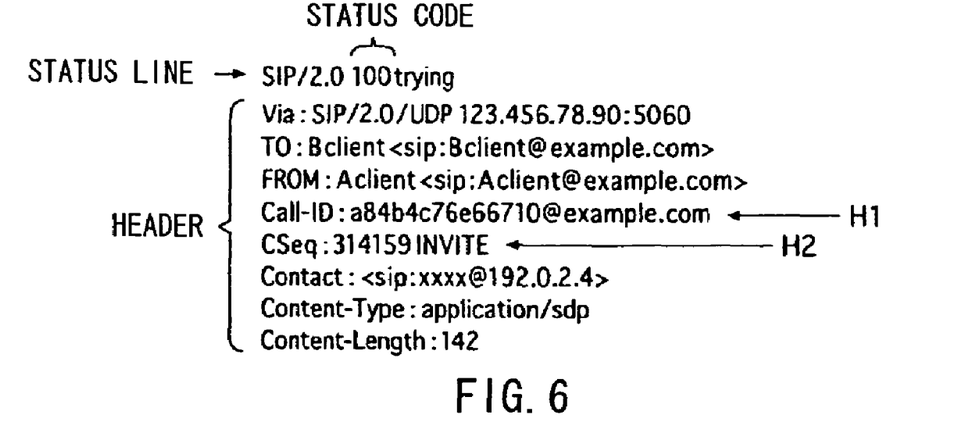
FIG. 6 is a view showing an arrangement example of the status line and header of a SIP message.

Examples of status codes are the "100", "180", and "200" portions of "100trying", "180ringing", and "200ok" response messages, and the communication protocols of the response messages are defined in, e.g., the respective status lines of the response messages, as shown in a "100trying" message of FIG. 6. In this case, as shown in FIGS. 5(A) and 5(B), for example, if a "250ok" message transmitted from a certain SIP server (4a) is different from a "200ok" message transmitted from another SIP server (4b), the difference is automatically identified by the automatic identification unit 10 (media communication program which enforces the execution of the automatic identification procedure), and the identification result is registered, in the database 16, in association with the communication protocol serving as the target of the identification process. According to this analysis method, analysis of the type of the status code of a response message makes it possible to identify a communication protocol (SIP messages) which is different for each of telecommunications carriers (SIP servers 4a and 4b) before session establishment. As a result, the client A can establish a session through SIP messages with a telecommunications carrier (SIP server 4a or 4b) which he/she tries to access and becomes able to receive the communication connection service provided by the telecommunications carrier.

As shown in the "100trying" message of FIG. 6, an example of a header is a portion below and subsequent to the status line. For example, a "Call-ID" field, "CSeq (Command Sequence)" field, or the like out of the portion may represent a feature of the response message. In this case, unique identification information (indicated by an arrow H1) for identifying the communication protocol of such a response message is defined in the "Call-ID" field, and a value (indicated by an arrow H2) which increments for each transaction is defined in the "CSeq" field. Accordingly, analysis of these header features makes it possible to identify a communication protocol (SIP messages) which is different for each of telecommunications carriers (SIP servers 4a and 4b) before session establishment, thus allowing establishment of a session through SIP messages of the corresponding type. As a result, the client A can receive the communication connection service provided by a telecommunications carrier which he/she tries to access.

(2) Method of Analyzing Call Flow at the Time of Message Exchange

Examples of a call flow at the time of message exchange are the flows of session management processes performed on the basis of SIP messages between different telecommunications carriers (SIP servers 4a and 4b) and the media communication apparatus 6, as shown in FIGS. 5 (A) and (B). In this case, as shown in FIG. 5 (B), for example, a "400 Proxy Authentication required" authentication request may be transmitted from the SIP server 4b to the media communication apparatus 6, depending on the types of the SIP servers 4a and 4b. Accordingly, analysis of the presence/absence of such an authentication request makes it possible to identify a communication protocol (SIP messages) which is different for each of telecommunications carriers (SIP servers 4a and 4b) before session establishment, thus allowing establishment of a session through SIP messages of the corresponding type. As a result, the client A becomes able to receive the communication connection service provided by a telecommunications carrier which he/she tries to access.

(3) Method of Analyzing Error Code Contained in Response Message

For example, an error code is contained in a "500 Bad Request" error message returned from either one of the SIP servers 4a and 4b when the SIP server cannot deal with an "INVITE" message, as shown in FIG. 5(C). Examples of an error code in this case can include request error responses numbered in the 400s, server error responses numbered in the 500s, global error responses numbered in the 600s, and the like. Each of request error responses numbered in the 400s is returned when, e.g., a request has a wrong format or cannot be processed by a corresponding SIP server. Each of server error responses in the 500s is returned when, e.g., a corresponding SIP server has failed in processing a request. Each of global error responses in the 600s is returned when a request cannot be processed by all SIP servers. Accordingly, analysis of such an error code makes it possible to identify a communication protocol (SIP messages) which is different for each of telecommunications carriers (SIP servers 4a and 4b) before session establishment, thus allowing establishment of a session through SIP messages of the corresponding type. As a result, the client A becomes able to receive the communication connection service provided by a telecommunications carrier which he/she tries to access.

(4) Method of Analyzing State of Communication protocol Obtained When Subscribe Request is Transmitted A subscribe request, "SUBSCRIBE", is transmitted, for example, when either one of the SIP servers 4a and 4b cannot deal with an "INVITE" message and returns a "500 Bad Request" error message, and the state (e.g., the state of a communication protocol (SIP messages) or the like) is required from the corresponding SIP server 4a or 4b, as shown in FIG. 5(C).

Figure 7:
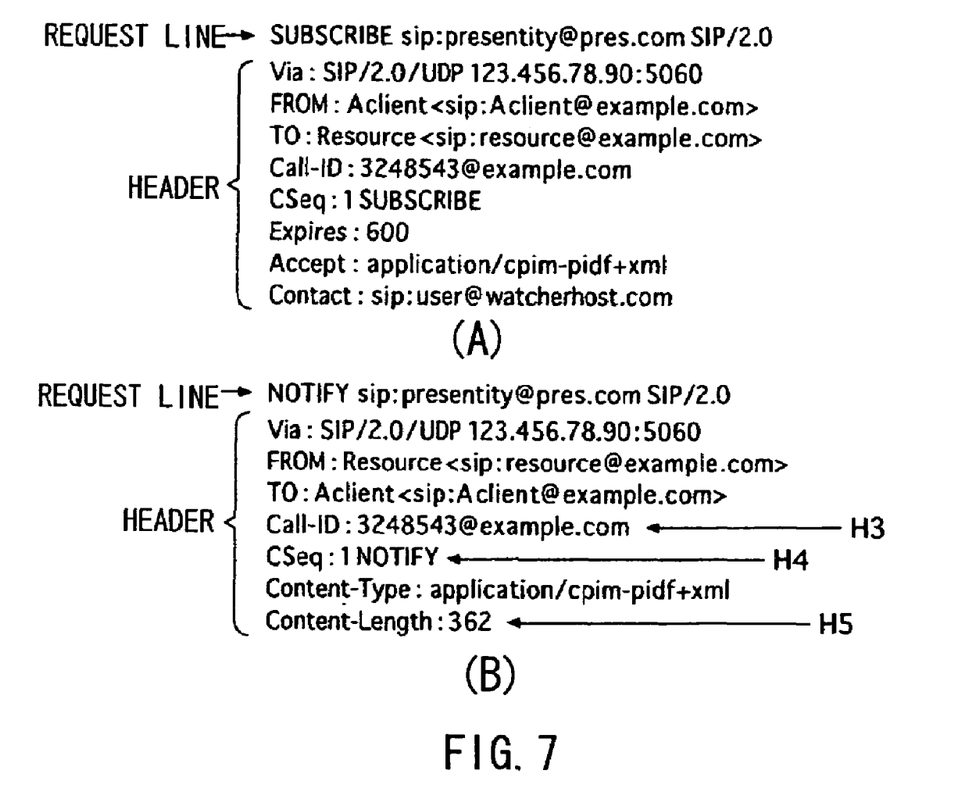
FIG. 7(A) is a view showing an arrangement example of the request line and header of a subscribe request.
FIG. 7(B), a view showing an arrangement example of the request line and header of a NOTIFY.

A "SUBSCRIBE" can be defined with, e.g., a request line and header as shown in FIG. 7(A). When such a request is transmitted, for example, a "NOTIFY" response is returned from the corresponding SIP server 4a or 4b, as shown in FIG. 7(B). In this case, out of the header of the "NOTIFY", e.g., the contents (not shown) of the "Call-ID" or "CSeq" field indicated by an arrow H3 or H4, the body size indicated by an arrow H5, i.e., the contents (not shown) of the "Content-Length" field, or the like may represent the state of the corresponding SIP server 4a or 4b.

Accordingly, analysis of such a "NOTIFY" makes it possible to identify a communication protocol (SIP messages) which is different for each of telecommunications carriers (SIP servers 4a and 4b) before session establishment, thus allowing establishment of a session through SIP messages of the corresponding type. As a result, the client A becomes able to receive the communication connection service provided by a telecommunications carrier which he/she tries to access.

Note that the above-described automatic identification methods (1) to (4) are merely examples. It goes without saying that any other method that allows identification falls within the scope of the present invention.

The above embodiment has assumed a case wherein the client A and media communication apparatus 6 are set up in the global space (on the Internet) together with the SIP servers 4a and 4b set up in the plurality of IP networks 2a and 2b, and a global IP address is assigned to each of the client A, media communication apparatus 6, and the SIP servers 4a and 4b.

Figure 3:
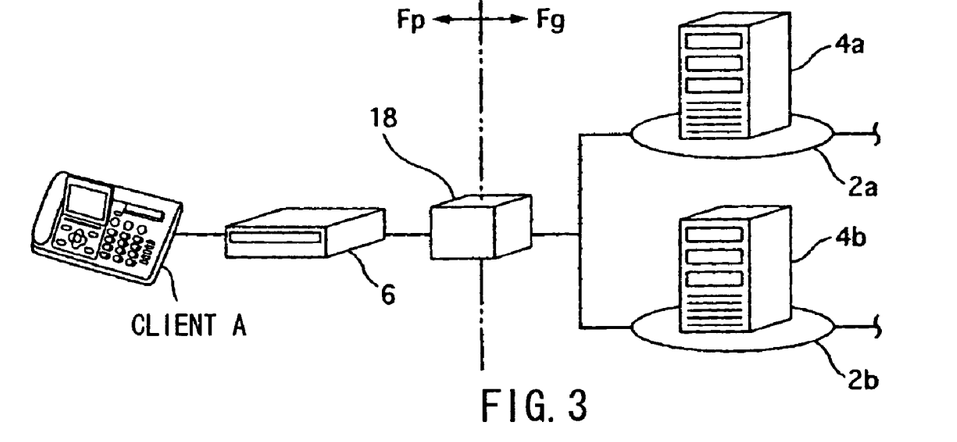
FIG. 3 is a view showing an arrangement example in which the client and media communication apparatus are set up in a private space while the SIP servers are set up in the global space.

However, besides this, there can be assumed, for example, a case wherein the client A and media communication apparatus 6 are set up in a private space Fp (e.g., an in-plant LAN), and the plurality of IP networks 2a and 2b in which the SIP servers 4a and 4b are set up are built in a global space Fg (on the Internet), as shown in FIG. 3. In this case, a private IP address is assigned to each of the client A and media communication apparatus 6, and a global IP address is assigned to each of the SIP servers 4a and 4b.

To communicate, in packets, voice information (media) across the different network spaces Fp and Fg, it is necessary to convert, to a global IP address, the private IP address of a packet to be transmitted from the private space Fp to the global space Fg and to convert, to a private IP address, the global IP address of a packet to be transmitted from the global space Fg to the private space Fp.

As a technique for meeting such a need, a NAT (Network Address Translator) can be utilized. Disposition of a device equipped with such a NAT function (e.g., a device 18 equipped with a NAT function such as a router or gateway) on the border between the private space Fp and the global space Fg allows packet communication between a terminal (e.g., the client A or media communication apparatus 6) to which a private IP address is assigned and a terminal (e.g., the SIP server 4a or 4b) to which a global IP address is assigned. For example, UPnP (Universal Plug and Play) or an ALG (Application Layer Gateway) can be used as the address translation function of the device 18 equipped with the NAT function. With this arrangement, a global IP address is written in a packet transmitted from the client A via the media communication apparatus 6 while a private IP address is written in a packet transmitted from the SIP server 4a or 4b to the client A and media communication apparatus 6.

The use of the device 18 equipped with the NAT function makes it possible to establish a session through SIP messages between the media communication apparatus 6 and the SIP servers 4a and 4b set up in the different network spaces Fp and Fg. As a result, the client A becomes able to receive the communication connection service provided by a telecommunications carrier which he/she tries to access.

Figure 4:
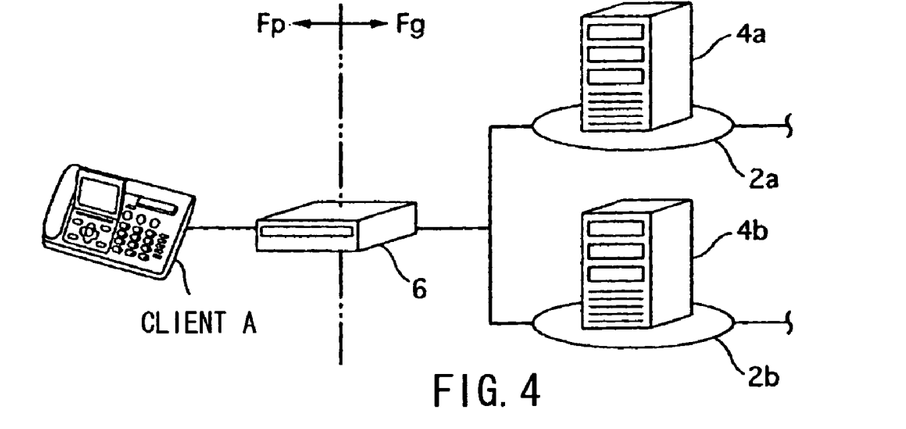
FIG. 4 is a view showing an arrangement example in which the media communication apparatus itself is equipped with a NAT function and is disposed on the border between the private space and the global space.

As a modification of the present invention, instead of using the device 18 equipped with the NAT function, for example, the media communication apparatus 6 itself may be equipped with a NAT function and may be disposed on the border between the private space Fp and the global space Fg, as shown in FIG. 4. This arrangement allows packet communication between a terminal (e.g., the client A) to which a private IP address is assigned and a terminal (e.g., the SIP server 4a or 4b) to which a global IP address is assigned.

Figure 8:
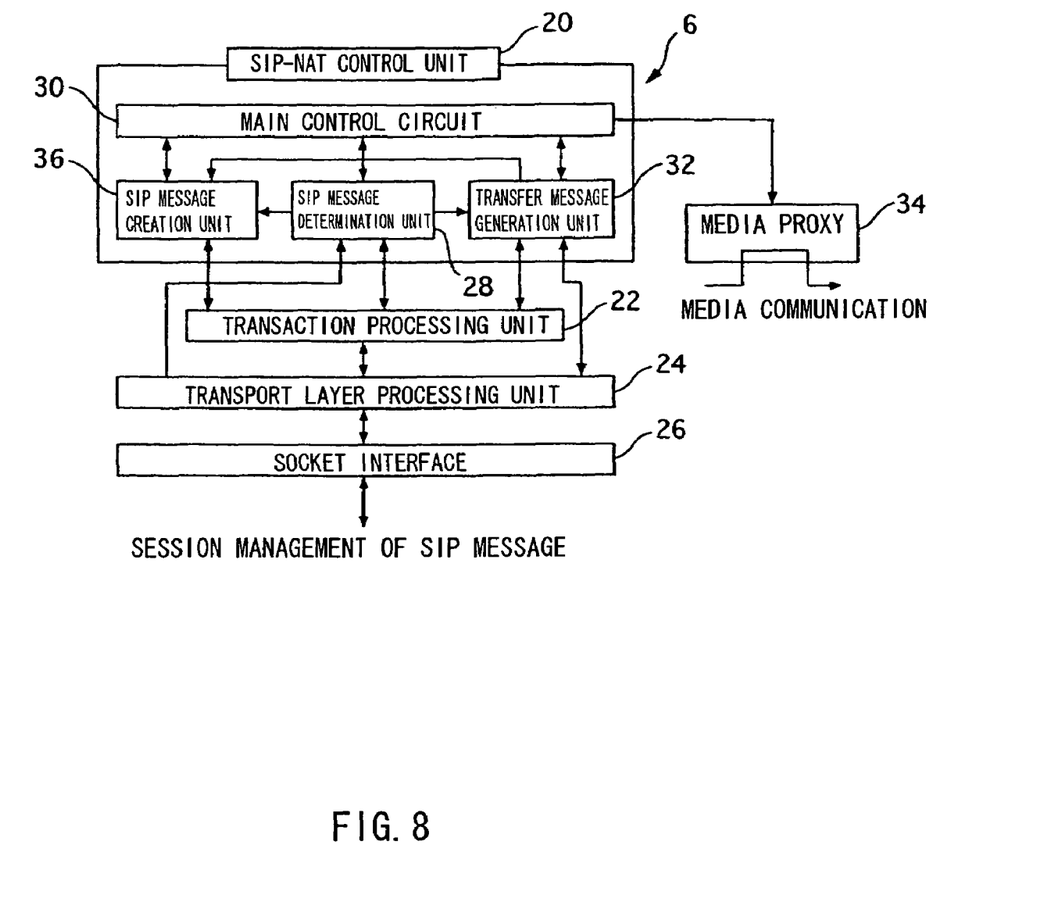
FIG. 8 is a diagram showing an arrangement example of the media communication apparatus equipped with a NAT function.

For example, FIG. 8 shows an arrangement example of the media communication apparatus 6 equipped with a NAT function. A SIP message (request message or response message) having undergone address translation in a SIP-NAT control unit 20 is subjected to status management in a transaction processing unit 22 and is then transmitted from a transport layer processing unit 24 via a socket interface 26. In this case, the SIP-NAT control unit 20 performs address translation between a private IP address and a global IP address, and the transport layer processing unit 24 performs a transfer process for the SIP message in accordance with a protocol which belongs to the transport layer.

An example of a SIP message process of the media communication apparatus 6 will be explained below.

For example, assume that the media communication apparatus 6 receives a SIP message through the socket interface 26, and the SIP message is not a transferred message but, e.g., a "100trying" message. In this case, the transport layer processing unit 24 creates a new incoming transaction and sends it out to the transaction processing unit 22. At this time, the transaction processing unit 22 manages the state of the transaction.

Then the SIP message is sent out to a SIP message determination unit 28, which subjects the SIP message to a syntax process (syntax analysis). After that, the SIP message is sent out to a main control circuit 30. At this time, the main control circuit 30 searches for the next transfer destination of the SIP message and returns the SIP message to the SIP message determination unit 28. If the SIP message has the wrong syntax or the next transfer destination is unknown, the SIP message determination unit 28 sends out the SIP message to a transferred message generation unit 32.

After the IP address of the next transfer destination is obtained, the main control circuit 30 subjects the transferred message to a correction process for NAT traversal, changes the client information and dialog state, and executes a command from a media proxy 34 while the transferred message generation unit 32 generates a basic transferred message. Note that software (e.g., an IP tables which operates on Linux) which performs packet filtering (rewriting of an IP header) is implemented in the media proxy 34.

In the meantime, the transferred message generation unit 32 generates a new outgoing transaction, associates the outgoing transaction with the incoming transaction, and sends out the newly generated transferred message to the transaction processing unit 22. If an error occurs during processing in the main control unit 30 or transferred message generation unit 32, the transferred message generation unit 32 sends out the transferred message to a SIP message creation unit 36 or abandons the transferred message, depending on the error.

The transferred message having been sent out to the transaction processing unit 22 is subjected to transaction state management. After that, the transferred message is subjected, in the transport layer processing unit 24, to a transfer process according to a protocol which belongs to the transport layer. The transferred message is then transmitted from the transport layer processing unit 24 via the socket interface 26.

By repeating the above-described processes, session management is performed between the media communication apparatus 6 and the SIP server 4a or 4b. After that, when a session is established, voice information (media) passes not through the media communication apparatus 6 but through, e.g., the media server 34 set up in the IP network 2 and is directly transmitted/received between terminals (e.g., between the clients A and B), in a speech state.

If a received SIP message is an "ACK" in response to an "INVITE", the SIP message is directly sent out from the transport layer processing unit 24 to the SIP message determination unit 28. In this case, neither incoming transactions nor outgoing transactions are generated. Also, no response message is generated even if some process ends in failure.

As described above, the equipment of the media communication apparatus 6 itself with a NAT function makes it possible to provide the IP telephony service of an arbitrary telecommunications carrier for the client A in the private space Fp while taking advantage of an existing network without change.

Note that in media communication apparatus 6 equipped with the NAT function (FIG. 8), for example, the SIP message determination unit 28 functions as an automatic identification unit, the transaction processing unit 22 and SIP message creation unit 36 function as a session establishment unit, and the transport layer processing unit 24 functions as a packet communication unit. As a substitute for a database, memory (not shown) of the main control circuit 30 suffices.

As described above, according to this embodiment and the modification thereof, even if a session is performed through SIP messages of a type specific to each telecommunications carrier in accordance with the specifications and settings of a SIP server of the telecommunications carrier, it is unnecessary to separately prepare a media communication apparatus specific to the telecommunications carrier as in a conventional arrangement. It is possible with just one media communication apparatus and media communication program to automatically identify different types of communication protocols used to communicate media in packets and establish a session according to an identified communication protocol. In this case, session management can be performed using an existing network environment without change, thus eliminating the need for the equipment cost required to separately prepare media communication apparatuses specific to respective telecommunications carriers. As a result, it is possible to receive the IP telephony communication connection service provided by each of telecommunications carriers efficiently at a low charge.

An arrangement which automatically selects a telecommunications carrier (e.g., one which offers the lowest communication charge) by preset criteria may be added to a media communication apparatus according to another embodiment of the present invention. For example, assume that with this arrangement, a telecommunications carrier which offers the lowest communication charge is automatically selected on the basis of communication charges set for each of IP (Internet Protocol) telephony telecommunications carriers, and the communication protocol of the telecommunications carrier (server for session management: the SIP server 4a or 4b) is automatically identified. This makes it possible to receive a communication connection service provided by the telecommunications carrier through a communication path to which the lowest communication charge applies.

In order to implement such an operational advantage, as shown in FIG. 9(A), each of media communication apparatuses 6 and 8 is provided with automatic selection means for automatically selecting a telecommunications carrier by preset criteria on the basis of the address of a speech terminal serving as a communication destination input at the time of call origination, in addition to the above-described arrangement (e.g., the arrangement shown in each of FIGS. 1 to 4). Since the arrangements of the media communication apparatuses 6 and 8 are the same, only an explanation of the arrangement of the media communication apparatus 6 will be given below. In this case, a program for automatically selecting a telecommunications carrier by preset criteria on the basis of the address of a speech terminal serving as a communication destination input at the time of call origination maybe programmed into (installed in) the media communication apparatus 6, or an automatic selection unit 38 (FIG. 9(B)) with a function as the automatic selection means may be implemented in the media communication apparatus 6. Note that examples of the address of a speech terminal serving as a communication destination include an IP telephone number, general subscriber telephone number, cellular telephone number, IP address, and the like.

As shown in FIG. 9(B), the automatic selection unit 38 is provided with a table in which various types of data used to select a telecommunications carrier by preset criteria are set, a telecommunications carrier registration unit (telecommunications carrier registration circuit 41) which registers a telecommunications carrier under contract with a calling speech terminal (e.g., a client A), a communication destination terminal determination unit (communication destination terminal determination circuit 40) which determines a speech terminal serving as a communication destination on the basis of the address input at the time of call origination, and a telecommunications carrier selection unit (telecommunications carrier selection circuit 42) which checks a determination result from the communication destination terminal determination unit against the various types of data in the table and selects a predetermined telecommunications carrier.

The various types of data in the table include communication charges, each based on an arbitrarily selected type of a speech terminal serving as a communication destination, communication time period, day of the week of communication, and communication distance, or communication charges set on the basis of the conditional factors and another additional one (e.g., a communication path). The communication charges are set for each of telecommunications carriers. As shown in FIG. 10, for example, the table can be set up in a database 16 and is provided with a telecommunications carrier registration field used to store a telecommunications carrier under contract with a calling speech terminal (client A). FIG. 10 shows an example in which carriers A, B, and C are registered as telecommunications carriers under contract in telecommunications carrier registration fields.

As a method of registering telecommunications carriers in the telecommunications carrier registration fields of the table, for example, there can be used a method of keying, with the calling speech terminal (client A), data about communication charges sent from the carriers A, B, and C when the speech terminal makes contracts with the carriers A, B, and C, a method of directly downloading data distributed from the carriers into the telecommunications carrier registration fields, or the like.

In any method, the telecommunications carrier registration circuit 41 registers (describes), e.g., the carriers A, B, and C and at the same time various types of data (e.g., data about communication charges) in the telecommunications carrier registration fields.

Figure 9:
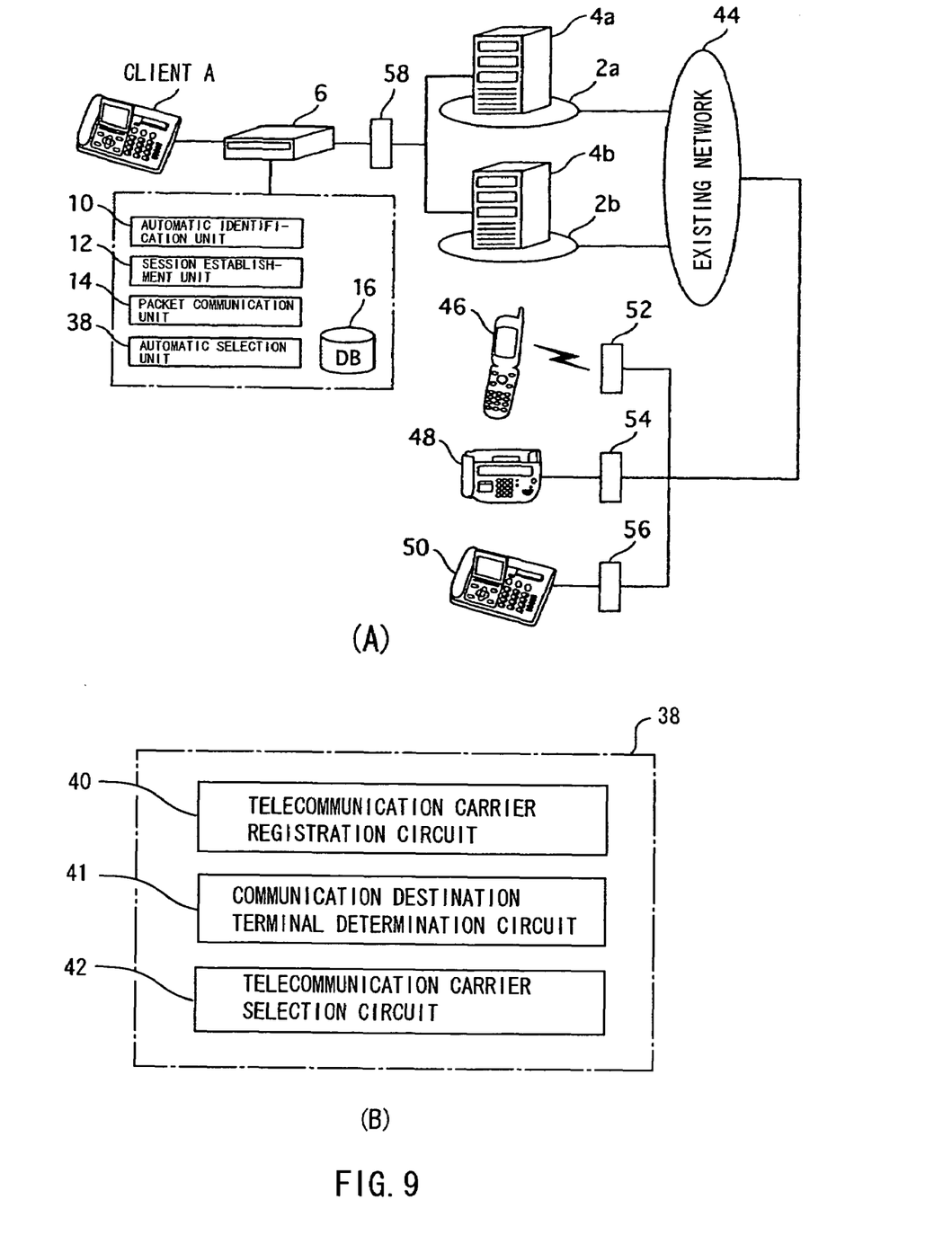
FIG. 9(A) is a diagram showing the basic arrangement of an IP network in which a media communication apparatus and media communication program according to another embodiment of the present invention are used.
FIG. 9(B), a diagram showing an arrangement example of an automatic selection unit.

The operation of this embodiment (FIG. 9) will be explained below.

In the explanation of the operation, the calling speech terminal (client A) has contracts with the carriers A and B, and SIP servers 4a and 4b of the carriers A and B are connected to, e.g., a cellular telephone 46, general subscriber telephone 48, and IP telephone 50 via IP networks 2a and 2b and an existing network 44 (network whose broad concept includes the IP networks 2a and 2b, the Internet, and the like). More specifically, the cellular telephone 46, general subscriber telephone 48, and IP telephone 50 are connected to the existing network 44 through a base station 52, existing telephone station 54, and VoIP gateway 56, respectively.

When the client A inputs, on the dial, the address of a speech terminal serving as a communication destination (e.g., the telephone number of the general subscriber telephone 48) to originate a call, the communication destination terminal determination circuit 40 of the media communication apparatus 6 (automatic selection unit 38) determines the speech terminal serving as the communication destination (general subscriber telephone 48) according to preset conditional factors on the basis of the address (telephone number) input at the time of call origination. For example, if the input telephone number is "03-3580-xxxx", the communication destination terminal determination circuit 40 determines, on the basis of its local area number "03", local office number "3580", and subscriber number "xxxx", that the speech terminal is the general subscriber telephone 48 installed in the Minato Ward of Tokyo (determines the type of the speech terminal serving as the communication destination). At the same time, the communication destination terminal determination circuit 40 also determines the communication time period (e.g., 8:00 to 23:00 on weekdays) and the communication distance (distance from the telephone station 54 to the general subscriber telephone 48: e.g., 30 km) at the time of input on the dial (at the time of call origination).

Next, the telecommunications carrier selection circuit 42 checks a determination result from the communication destination terminal determination circuit 40 against the various types of data in the table. The determination result includes, e.g., the type of the speech terminal serving as the communication destination, communication time period, communication distance, and the like. A telecommunications carrier which offers the lowest communication charge is selected by checking such a determination result against the various types of data in the table (FIG. 10).

In this case, since the client A has contracts with the carriers A and B, communication charges offered by both the carriers are compared, and one which offers the lowest communication charge is selected. For example, compare the charges for communication to the general subscriber telephone 48 during a communication time period of 8:00 to 23:00 on weekdays over a communication distance of up to 30 km. In this case, the communication charge offered by the carrier A is the sum (¥39/3 min) of the basic communication charge (¥9/3 min) and the charge for a communication distance of up to 30 km (¥30/3 min) while the communication charge offered by the carrier B is the sum (¥40/4 min) of the basic communication charge (¥10/4 min) and the charge for a communication distance of up to 30 km (¥30/4 min). The comparison result shows that the communication charge offered by the carrier A is lower than that offered by the carrier B, and thus the carrier A is selected.

After that, an automatic identification unit 10 identifies the communication protocol of the SIP server 4a of the carrier A, and a session establishment unit 12 establishes a session according to the identified communication protocol. On the basis of the established session, media (in this case, voice) is communicated in packets from a packet communication unit 14 toward the SIP server 4a. This makes it possible to receive the communication connection service provided by the carrier A. More specifically, a connection for speech with the general subscriber telephone 48 is established through a communication path (e.g., the IP network 2a and existing network 44) of the carrier A, thereby allowing mutual speech between the client A and the general subscriber telephone 48. Since the arrangements and operational advantages of the automatic identification unit 10, session establishment unit 12, and packet communication unit 14 have been described, an explanation thereof will be omitted.

As described above, this embodiment is provided with the automatic selection unit 38 which automatically selects a telecommunications carrier by preset criteria on the basis of the address of a speech terminal serving as a communication destination input at the time of call origination. With this arrangement, for example, automatic selection of a telecommunications carrier which offers the lowest communication charge on the basis of communication charges set for each of IP telephony telecommunications carriers and automatic identification of the communication protocol of the telecommunications carrier (server for session management) make it possible to receive the communication connection service provided by the telecommunications carrier through a communication path to which the lowest communication charge applies.

Figure 11:
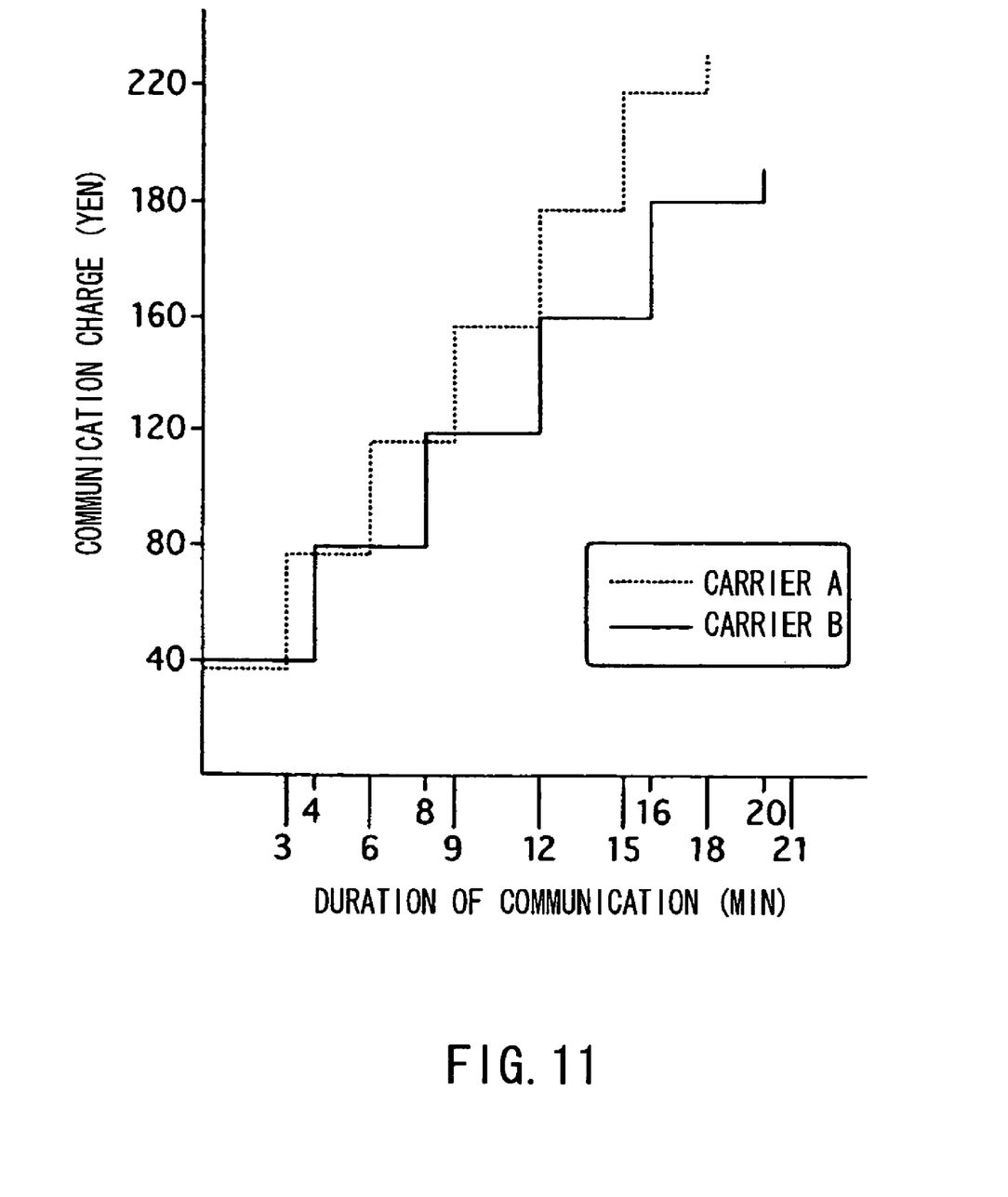
FIG. 11 is a graph for explaining that communication charges are inverted depending on the duration of communication.

In the above embodiment, a telecommunications carrier which offers the lowest communication charge is selected on the basis of the result of comparing basic communication charges per unit time. However, a telecommunications carrier which offers the lowest communication charge may be switched to one different from the selected telecommunications carrier, depending on the duration of communication (speech). In the embodiment, the carrier A which offers a communication charge of ¥39/3 min is selected. For example, as shown in FIG. 12, if the communication duration exceeds 12 min, the communication charge offered by the carrier B becomes lower. In this case, if the client A can grasp in advance the duration of communication, a telecommunications carrier which offers the lowest communication charge can be correctly selected by determining a communication charge according to the communication duration.

As a communication charge determination method in consideration of the duration of communication, for example, there can be considered a method of personally reporting a communication duration when the client A inputs, on a dial, the address of a communication destination, and a method of keeping the history of communication sessions (e.g., a communication duration) with a speech terminal with which the client A has communicated in the past and automatically extracting the durations of past communication sessions when communicating with the same speech terminal. Note that, for example, the database 16 may be used as the storage location of the communication history.

In any method, the telecommunications carrier selection circuit 42 checks a determination result from the communication destination terminal determination circuit 40 against the various types of data in the table, in consideration of, e.g., the relationship between the communication durations and the communication charges as shown in FIG. 11. This makes it possible to correctly select a telecommunications carrier which offers the lowest communication charge.

Depending on the type of a speech terminal serving as a communication destination, a case may be assumed wherein communication charges offered by telecommunications carriers are equal to each other. For example, if a speech terminal serving as a communication destination is a contract IP telephone, the carriers A and B make no charge for communication, and the comparison results in no difference. In this case, to automatically select a specific telecommunications carrier, a server load distribution apparatus 58 (e.g., a load balancer or various switches (not shown)) may be additionally provided to the media communication apparatus 6. With this arrangement, when selecting a specific telecommunications carrier, the automatic selection unit 38 can select a specific telecommunications carrier (SIP server 4a or 4b) which has the least traffic at that time. As a result, the communication efficiency can be increased.

According to a media communication apparatus and media communication program of the present invention, it is possible to automatically select a telecommunications carrier by preset criteria on the basis of the address of a speech terminal serving as a communication destination input at the time of call origination and communicate media in accordance with the communication conventions of the server of the selected telecommunications carrier.

Additional advantages and modifications will readily occur to those skilled in the art. Therefore, the invention in its broader aspects is not limited to the specific details or representative embodiments shown and described herein. Accordingly, various modification may be made without departing from the spirit or scope of the general inventive concept as defined by the appended claims and their equivalents.

What is claimed is:

1. A media communication apparatus, connected to a calling speech terminal of a communication source which is capable of receiving communication connection services provided by telecommunications carriers, the media communication apparatus comprising:

an auto selection unit automatically selecting a telecommunications carrier on the basis of an address of a speech terminal inputted as a communication destination at a call origination by the calling speech terminal of the communication source, in accordance with a preset criterion; and a communication system communicating media between the calling speech terminal of the communication source and the calling speech terminal of the communication destination via a server of the telecommunication carriers selected by the auto selection unit, wherein the communication system is operable to:

prior to establishing a session with the sever of the selected telecommunication carrier, transmit to the server a request message for establishing a session with the server;

analyze contents of a response message received from the server responsive to the transmission;

identify a type of a communication convention of the sip server used to communicate media on the basis of a result of analyzing the contents of the response message; and establish a session with the server in accordance with the identified communication sip convention of the server, and then, communicate media on the basis of the established session, wherein the communication system identifies a communication convention of the server by analyzing contents of a response message received in response to transmission of a subscribe request for requesting a state of the server in a case where an error message is returned from the server in response to transmission of the request message to the server of the telecommunication carrier selected by the auto selection unit.

2. A media communication apparatus that is connected to servers of a plurality of communications carriers, a respective one of which adapted to set a communication charge system different from one another, according to a type of a communication terminal of a transmission source and a type of a communication terminal of a transmission destination, and that is set up between the communication terminal of the transmission source and the server, said apparatus comprising:

(i) an auto selection unit having a database which stores communication charge data different depending upon a type of the communication terminal set for a respective one of the plurality of communications carriers, and automatically selecting a server of one of the plurality of communications carriers by correlating an address of the communication terminal of the transmission destination input upon call origination by the communication terminal of the transmission source with the communication charge data stored in the database for a respective one of the plurality of communications carriers;

(ii) a transmission unit for, prior to establishing a session with the server of the communications carrier selected by the auto selection unit, transmitting a request message for establishing the session with the server to the server of the communications carrier selected by the auto selection unit;

(iii) an analysis unit for analyzing contents of a response message received from the server of the communications carrier selected by the auto selection unit responsive to the transmission of the transmission unit;

(iv) an identification unit for identifying a type of a communication convention of the server of the communications carrier selected by the auto selection unit used to communicate media, on the basis of a result of analyzing the contents of the response message by the analysis unit; and (v) a communication unit for establishing a session with the server of the communications carrier selected by the auto selection unit, in accordance with the communication convention of the server of the communications carrier selected by the auto selection unit, the communication convention being identified by the identification unit, and then, communicating media between the communication terminals of the transmission source and the transmission destination, via the server of the communications carrier selected by the auto selection unit on the basis of the established session.

3. The media communication apparatus according to claim 2, wherein:

the database of the auto selection unit further stores a scheduled time of phone conversation with the communication terminal of the transmission destination input in advance upon call origination by the communication terminal of the transmission source and a communication history concerning a communication time between the communication terminals of the transmission source and the transmission destination communicated in past; and the auto selection unit automatically selects a server of one of the plurality of communications carriers on the basis of the address of the communication terminal of the transmission destination, the communication charge data for a respective one of the plurality of communications carriers stored in the database, and the scheduled phone conversation time or communication history stored in the database.

4. The media communication apparatus according to claim 3, wherein:

the database of the auto selection unit further stores a plurality of data tables corresponding to the plurality of communications carriers and having registered various types of data concerning a prescribed communications carrier of the communication terminal of the transmission source; and the variety of the data stored in the data tables includes a communication charge according to an item arbitrarily selected from among the type of the communication terminal of the transmission destination, a communication time period, day of the week of communication, and a communication distance or a communication charge set by adding any other condition.

5. The media communication apparatus according to claim 4, wherein:

the auto selection unit selects a data table corresponding to a communications carrier of a relatively lowest communication charge, from among the plurality of data tables stored in the database, based upon the address of the communication terminal of the transmission destination input upon call origination by the communication terminal of the transmission source; and automatically selects a server of one of the plurality of communications carriers on the basis of a result of the selection.

6. The media communication apparatus according to claim 2, wherein:

the analysis unit analyzes a type of a status code included in a response message received from a server of the communications carrier; and the identification unit identifies the type of the communication convention of the server of the communications carrier.

7. The media communication apparatus according to claim 2, wherein:

the analysis unit analyzes a feature of a header included in the response message received from the server of the communications carrier; and the identification unit identifies the type of the communication convention of the server of the communications carrier.

8. The media communication apparatus according to claim 2, wherein:

the analysis unit analyzes an error code included in the response message received from the server of the communications carrier; and the identification unit identifies the type of the communication convention of the server of the communications carrier.

9. The media communication apparatus according to claim 2, wherein:

the analysis unit analyses presence or absence of authentication from the server included in the response message received from the server of the communications carrier; and the identification unit identifies the type of the communication convention of the server of the communications carrier.

10. The media communication apparatus according to claim 2, wherein:

the communication conventions are communication protocols different from one another depending upon a server of a communications carrier performing session management for making a communication between the communication terminals of the transmission source and the transmission destination upon packet communication between media; and the communication unit makes media communication in conformance with the communication protocol belonging to a transport layer, in response to the request message received from the server of the communications carrier.

11. A media communication method using a media communication apparatus that is connected to servers of a plurality of communications carriers, a respective one of which is adapted to set a communication charge system different from one another, according to a type of a communication terminal of a transmission source and a type of a communication terminal of a transmission destination, and that is set up between the communication terminal of the transmission source and the server, said method comprising the steps of:

(i) by means of an auto selection unit having a database which stores communication charge data different depending upon a type of the communication terminal set for a respective one of the plurality of communications carriers, automatically selecting a server of one of the plurality of communications carriers by correlating an address of the communication terminal of the transmission destination input upon call origination by the communication terminal of the transmission source with the communication charge data stored in the database for a respective one of the plurality of communications carriers;

(ii) by means of a transmission unit, prior to establishing a session with the server of the communications carrier selected by the auto selection unit, transmitting a request message for establishing the session with the server to the server of the communications carrier selected by the auto selection unit;

(iii) by means of an analysis unit, analyzing contents of a response message received from the server of the communications carrier selected by the auto selection unit responsive to the transmission of the transmission unit;

(iv) by means of an identification unit, identifying a type of a communication convention of the server of the communications carrier selected by the auto selection unit used to communicate media, on the basis of a result of analyzing the contents of the response message by the analysis unit; and (v) by means of a communication unit, establishing a session with the server of the communications carrier selected by the auto selection unit, in accordance with the communication convention of the server of the communications carrier selected by the auto selection unit, the communication convention being identified by the identification unit, and then, communicating media between the communication terminals of the transmission source and the transmission destination, via the server of the communications carrier selected by the auto selection unit on the basis of the established session.

12. The media communication method according to claim 11, further comprising:

by means of the database of the auto selection unit, further storing a scheduled time of phone conversation with the communication terminal of the transmission destination input in advance upon call origination by the communication terminal of the transmission source and a communication history concerning a communication time between the communication terminals of the transmission source and the transmission destination communicated in past; and in the step (i), by means of the auto selection unit, automatically selecting a server of one of the plurality of communications carriers on the basis of the address of the communication terminal of the transmission destination, the communication charge data for a respective one of the plurality of communications carriers stored in the database, and the scheduled phone conversation time or communication history stored in the database.

13. The media communication method according to claim 12, further comprising:

by means of the database of the auto selection unit, further storing a plurality of data tables corresponding to the plurality of communications carriers and having registered various types of data concerning a prescribed communications carrier of the communication terminal of the transmission source, wherein the variety of the data stored in the data tables includes a communication charge according to an item arbitrarily selected from among the type of the communication terminal of the transmission destination, a communication time period, day of the week of communication, and a communication distance or a communication charge set by adding any other condition.

14. The media communication method according to claim 13, further comprising:

in the step (i), by means of the auto selection unit, selecting a data table corresponding to a communications carrier of a relatively lowest communication charge, from among the plurality of data tables stored in the database, based upon the address of the communication terminal of the transmission destination input upon call origination by the communication terminal of the transmission source; and automatically selecting a server of one of the plurality of communications carriers on the basis of a result of the selection.

\* \* \* \* \*